Figure 1:
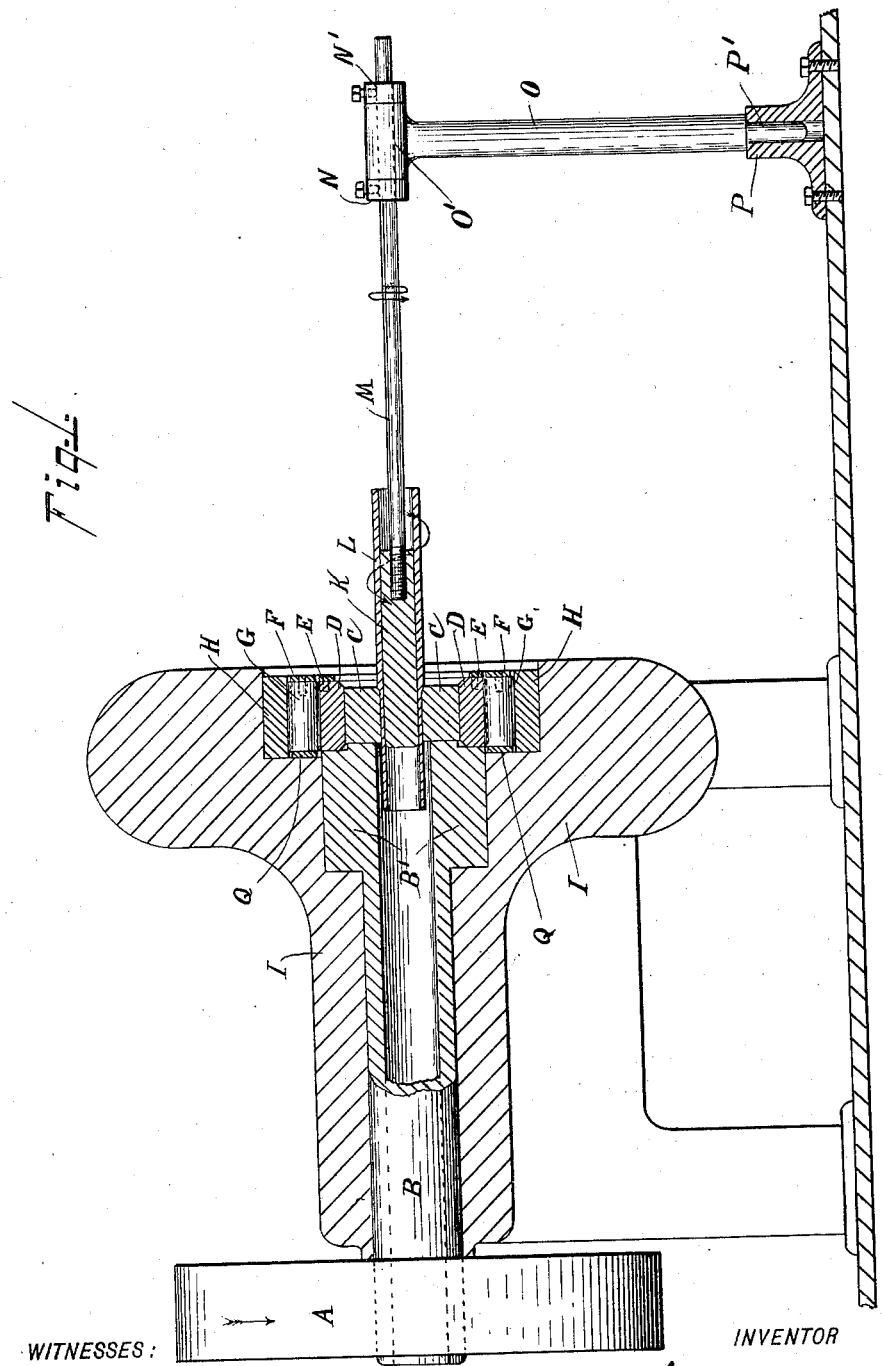

No. 654,590.　　　　　　　　　　　　　　Patented July 31, 1900.
H. R. BAKER.
REDUCTION TO HOLLOW WIRE OF TUBULAR SHELLS OF GOLD.
(Application filed Mar. 3, 1900.)
(No Model.)　　　　　　　　　　　　　　　　2 Sheets—Sheet 1.

WITNESSES:　　　　　　　　　　　　　　　INVENTOR
Walter C. Pusey　　　　　　　　　　　　Henry R. Baker
A. V. Groupe　　　　　　　　　　　　　　BY Isaac W. Heysinger
　　　　　　　　　　　　　　　　　　　　　　ATTORNEY No. 654,590. Patented July 31, 1900.
H. R. BAKER.
REDUCTION TO HOLLOW WIRE OF TUBULAR SHELLS OF GOLD.
(Application filed Mar. 3, 1900.)
(No Model.) 2 Sheets—Sheet 2.
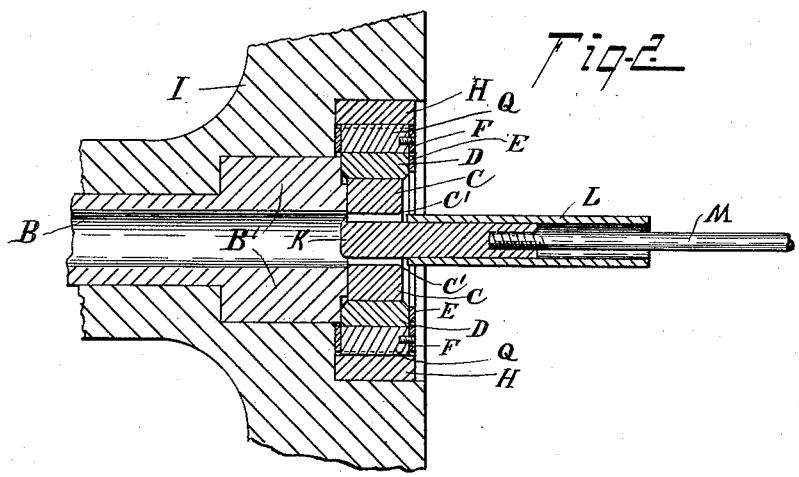
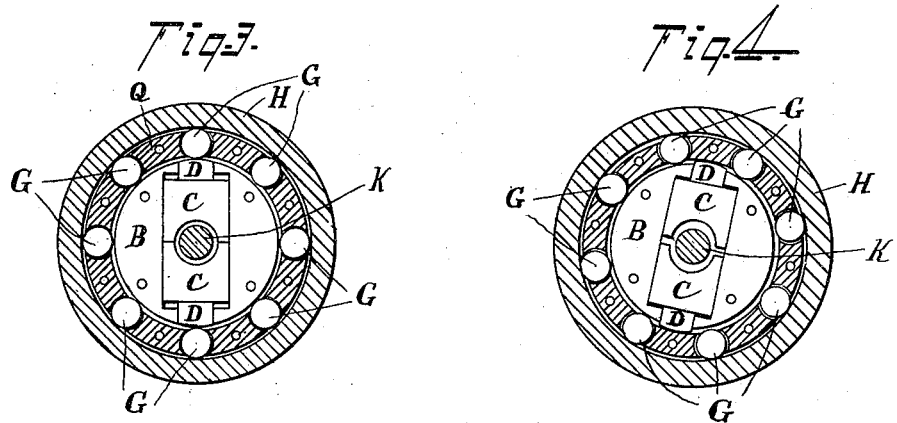
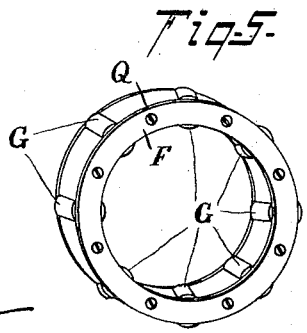
WITNESSES:
INVENTOR
Henry R. Baker
BY
Isaac W. Heysinger
ATTORNEY

UNITED STATES PATENT OFFICE.

HENRY R. BAKER, OF ATTLEBOROUGH, MASSACHUSETTS, ASSIGNOR OF ONE-HALF TO THE R. F. SIMMONS COMPANY, OF SAME PLACE.

REDUCTION TO HOLLOW WIRE OF TUBULAR SHELLS OF GOLD.

SPECIFICATION forming part of Letters Patent No. 654,590, dated July 31, 1900.

Application filed March 3, 1900. Serial No. 7,152. (No model.)

*To all whom it may concern:*

Be it known that I, HENRY R. BAKER, a citizen of the United States, residing at North Attleborough, in the county of Bristol and State of Massachusetts, have invented a certain new and useful Improvement in the Reduction to Hollow Wire of Tubular Shells of Gold or Like Metal, of which the following is a full, clear, and exact description, reference being had to the drawings which accompany and form a part of this specification, in which—

Figure 1 is a longitudinal vertical section through the rotary reducing-machine, showing the driving-pulley A and its adjacent parts in surface view, the other parts broken away to show section, and the standard, arbor, and adjacent parts also shown in place in the machine, the tubular gold shell L, which is undergoing reduction, being shown also in section. Fig. 2 is a similar sectional view of the working parts to that shown in Fig. 1, detached, and showing the beaters and gold shell in position when compression is not yet being made by said beaters. Fig. 3 is a front view of the working parts with the beaters closed, as in Fig. 1. Fig. 4 is a similar view to Fig. 3 with the beaters open, as in Fig. 2. Fig. 5 is a perspective view of the cage which carries the rollers, with the rollers shown in place.

The lettering in all the figures is uniform.

The object of my invention is to reduce the thickness and extend the length of malleable metal tubular shells, such as the hollow ingots of gold or like metal used in the manufacture of hollow wires for gold chains or like purposes, in which the compression and longitudinal extension are produced by hammering devices which by a rapid succession of sudden blows around all parts of the cylinder cause a swaging action, thus producing a better and more even product than could be produced by the action of rolls or the like and in which an even texture is produced throughout and liability of splitting or unevenness of thickness on different sides of said tubular shell is avoided. For this purpose I employ the connected mechanism, the construction and operation of which I will now describe.

The machine consists of a heavy frame I. (Shown in Fig. 1.) The frame I has a bearing for shaft B, driven by the pulley A in the direction of the arrow in Fig. 1. The shaft B is hollow, as shown, to allow the work to pass through. One end of the shaft is enlarged in diameter at B' and carries beaters C and followers D in suitable slots cut across the end of the shaft. These followers and beaters are retained in place longitudinally, but permitted to reciprocate radially in said slots by means of a steel ring attached to the enlarged front face of the hollow shaft B by means of screws, the holes for which are shown in Figs. 3 and 4 and the screws in place and the ring also. (See letters E E in Figs. 1 and 2.) It will be seen from the drawings that beaters C and followers D are compelled to rotate together with shaft B, but can move radially in their slots.

The frame I has fitted to it a hardened-steel ring H, located concentric with shaft B and forced in its seat, so as to be stationary. Within ring H are located a series of rollers G. The rollers are kept parallel to each other and to the axis of shaft B and also kept equal distances apart by the containing-cage Q. This cage Q is a cylinder or shell of a thickness somewhat less than the diameter of rollers G and is provided with cylindrical grooves that form receptacles for the rollers. The rollers are kept in place in the cage Q by a retaining-ring F. (Shown in Fig. 1.)

At a suitable distance from frame I a support P is fastened to the floor. This support carries a standard O, which is free to rotate, as shown at P', in P. The standard O furnishes a bearing O' for the shank or rod M, allowing the rod to rotate in O, as indicated by arrows, but keeping M from moving in the direction of its axis by means of collars N N', fastened to rod M by set-screws. The height of bearing in standard O is such as to bring the rod M in line with the axis of shaft B. On the end of the rod M is threaded a hardened-steel arbor K of suitable length and of a diameter corresponding to the inside diameter of the work or ingot L, as shown in Figs. 1 and 2.

The operation of the machine is as follows: The first step after the machine is started and running in the direction of the arrows in Fig. 1 is to place the ingot L as shown in Fig. 2. This is done by loosening collar N, Fig. 1, sliding rod M and arbor K to the right far enough from the machine to allow the arbor K to swing in a horizontal plane by turning standard O about in the base P. In this manner sufficient space between frame I and the end of arbor K is obtained to allow ingot L to be passed over the end of arbor K. Arbor K is then returned to position as shown in Fig. 1, collar N is tightened, and the ingot L is brought up against the dies, as in Fig. 2, ready to be reduced.

Fig. 3 shows the dies C in their closed position viewed from the end of the machine. Fig. 4 shows the dies C in their open position. The opening and closing is caused by the rotation of shaft B, which carries the beaters C and followers D around, so as to alternately bring the followers out of engagement with rollers G, as in Fig. 4, or in engagement, as shown in Fig. 3. The position as in Fig. 4 of the beaters C and followers D is owing to the centrifugal force which causes the beaters and followers to fly outward from the position shown in Fig. 3 when shaft B has rotated through an angle sufficient to carry followers D clear of rollers G. When shaft B, beaters C, and followers D are in position as in Fig. 4, it will be seen that the space between the arbor K and beaters C is larger than the space shown in Fig. 3 and that in this position of beaters the ingot L can be started in between the beaters by pushing it toward the left in Fig. 2 ready to be reduced by the succeeding closing of the beaters, as shown in Figs. 1 and 3. The beaters, as shown in Figs. 1 and 2, have the edges C' C' where the work centers suitably rounded, thus bringing the strain away from the edges, also making it easier for the ingot to enter. The feed longitudinally of the ingot takes place by the hand of the operator each time the beaters are in position as in Fig. 4, and every time the beaters are closed the ingot receives a slight rotary motion in the same direction as the shaft B revolves, as indicated by arrows around L and M, Fig. 1.

It will be observed that by means of the sliding rod M various lengths of arbors K can be used interchangeably, as desired, and by means of the adjustments N N' the arbor can be set at any depth in the machine which may be necessary. The shell of any metal which is being reduced clears itself over the inner end of the arbor K and thence advances as its forward end is pushed by hand into the machine in tubular form without any internal core. The hollow gold shell or ingot in operation is entirely controlled by the hand of the operator just as he desires to move it, either forward or back on the mandrel or allow it to turn around the mandrel, if desired. It will also be seen that the standard O being adapted to rotate on its own axis in the support P the rod M, carrying the arbor K, can be slipped through its journal-bearing in the upper end of O (the attachment N being released) and swung aside in O as a pivot and a new tubular shell be at once inserted without interfering in any degree with the centering, supports, or distances of the various parts, thus producing absolute evenness of result in all cases. While I show certain specific forms of securing these latter results, as N N' O P P', by screws, journals, and rotating rod and standard, I do not confine myself rigidly to the specific forms or attachments shown, but vary the same to suit special requirements, as would be done by any capable mechanic skilled in the art to which my invention pertains and without the exercise of further invention.

Having thus described my invention, what I claim, and desire to secure by Letters Patent, is—

1. The improvement in means for the reduction to hollow wire of tubular shells of gold or like metal, consisting in the combination with alternately-reciprocated beaters of a rotary reducing-machine substantially as described, of a rotatable arbor, for the support of said shells within said machine, said arbor provided with a guide-rod journaled to rotate upon its axis in a suitable support at its attached end, said guide-rod and arbor adapted to be rotated by the rotary beaters of said machine, said guide-rod rigidly secured against longitudinal movement thereof by means of attachments secured thereto, and said arbor adapted to be secured by said attachments at any desired depth between said beaters, and thereby rigidly held against longitudinal movement within said machine during the reduction in thickness and longitudinal extension of said shells thereby, said tubular shells adapted to pass over said arbor while being reduced, the movements of said tubular shells controlled by the hand of the operator, said elongated shells adapted to pass out of said machine in tubular form and without internal support, substantially as described.

2. In combination with a rotary reducing-machine, having rotary beaters substantially as described, a fixed support in front of the machine, a vertical standard rising from said support, and rotatable on its axis therein, said standard provided with a horizontal journaled bearing at its upper end, together with a horizontal rod, carrying a shell-supporting arbor at its free end, within the jaws of said machine, said rod constructed to be rotated on its axis by means of said rotary beaters adjustable longitudinally in said bearing of said standard, and adapted to be secured against longitudinal movement during the operation thereof by suitable stops applied thereto, substantially as and for the purpose described.

3. In combination with a rotary reducing-machine, substantially as described, having rotating beaters, a hollow supporting-shaft and means for alternately compressing said beaters upon a central mass between the same, and releasing said mass, an arbor located between said beaters, said arbor held against longitudinal displacement, and adapted to receive around the same a hollow ingot or shell of gold or like metal, said arbor and said shell acted on and rotated by said beaters, and said shell, as it is reduced thereby adapted to be pushed gradually through said machine, thereby clearing said longitudinally-fixed arbor, and advancing in tubular form and without any core or internal support in contact with said shell, together with an adjustable support, outside said machine, for said arbor, substantially as described.

4. In combination with the rotary reducing-machine, substantially as described, a fixed support, P, a vertical standard, O, adapted to be rotated in said support, a transverse journal-bearing, O', in the upper part thereof, a horizontal rod and arbor, M, K, journaled rotatably in said bearing, said arbor, K, adjustably held between the beaters, C, C, of said machine, substantially as and for the purpose described.

5. In combination with the rotary reducing-machine, having rotary beaters substantially as described, the shell-supporting arbor, K, detachably secured between the beaters thereof, C, C, the longitudinally-adjustable horizontal rod, M, extended from said arbor out of the said machine, and adjustable means of support for said rod, to hold the same against longitudinal displacement during the rotation thereof, said rod adapted to be rotated on its own axis in said support by said rotary beaters, substantially as described.

6. In combination with the rotary reducing-machine, I, having driving-pulley, A, hollow shaft, B, rotary beaters C, C, and followers D, D', and compressing-rolls, G, G, the shell-supporting arbor, K, interposed between said beaters, the rod, M, secured to said arbor, the journaled standard, O, said rod adapted to be rotated therein by said rotary beaters, and adjusting-clamps, N, N', to hold said arbor from longitudinal movement into the said machine during the rotation thereof, and adapted when released, to permit said arbor to be slid back from said machine, and afterward again replaced, without affecting its relative position therein, substantially as described.

7. The improved means of reducing to hollow wire, tubular shells of gold or the like, consisting of the rotary reducing-machine, substantially as described, the rotatable arbor, K, rod, M, adjustments, N, N', journal-bearing, O', standard, O, said standard rotatable on its axis, and fixed support, P, having journal-bearing, P', for said standard, the whole constructed and adapted to be operated substantially as and for the purposes herein set forth.

In testimony whereof I have hereunto affixed my signature this 26th day of February, A. D. 1900.

HENRY R. BAKER.

Witnesses:
ARTHUR C. MAIR,
PHILIP E. BRADY.